United States Patent [19]

Jacobsen

[11] Patent Number: 5,785,592
[45] Date of Patent: Jul. 28, 1998

[54] INTERACTIVE TARGET GAME SYSTEM

[75] Inventor: Stephen C. Jacobsen, Salt Lake City, Utah

[73] Assignee: Sarcos, Inc., Salt Lake City, Utah

[21] Appl. No.: 695,788

[22] Filed: Aug. 12, 1996

[51] Int. Cl.$^6$ .................. F41J 5/00; A63B 67/00; A63F 9/24
[52] U.S. Cl. .................. 463/7; 463/52; 463/53; 472/62; 472/43; 472/129; 273/349; 273/355; 273/358
[58] Field of Search .................. 463/1–2, 5, 49–53, 463/40, 41, 45, 56, 16–19; 472/117, 128, 129, 13, 62, 43; 446/175, 473; 434/20–22, 307 R; 364/410–412, 478.01, 478.04, 478.13, 479.01; 273/348, 349, 355, 358, 317.1

[56] References Cited

U.S. PATENT DOCUMENTS

| | | |
|---|---|---|
| 1,124,336 | 1/1915 | Schmitt . |
| 4,175,353 | 11/1979 | Pickett . |
| 4,395,045 | 7/1983 | Baer ............... 463/5 |
| 4,487,583 | 12/1984 | Brucker ............... 463/52 |
| 4,533,144 | 8/1985 | Juarez ............... 463/50 |
| 4,545,583 | 10/1985 | Pearman ............... 463/50 |
| 4,695,058 | 9/1987 | Carter, III ............... 463/5 |
| 4,754,133 | 6/1988 | Bleich ............... 463/5 |
| 4,772,028 | 9/1988 | Rockhold ............... 463/5 |
| 4,802,675 | 2/1989 | Wong ............... 446/473 |
| 4,830,381 | 5/1989 | Sellner ............... 463/5 |
| 4,844,476 | 7/1989 | Becker ............... 463/5 |
| 4,898,391 | 2/1990 | Kelly ............... 463/50 |
| 5,127,657 | 7/1992 | Ikezawa ............... 472/62 |
| 5,320,362 | 6/1994 | Bear ............... 463/50 |
| 5,382,026 | 1/1995 | Harvard ............... 463/35 |
| 5,613,913 | 3/1997 | Ikematsu et al. ............... 463/52 |

Primary Examiner—Jessica Harrison
Assistant Examiner—Mark A. Sager
Attorney, Agent, or Firm—Thorpe, North & Western, LLP

[57] ABSTRACT

An interactive target game system for one or more players includes at least one designator, in the form of a pistol, holdable by a player for aiming at a target and operating to simulate shooting at the target. The designator includes a photodetector for detecting an electromagnetic beam when the designator is accurately aimed at a beam source. Also included is at least one target viewable by the player for periodically producing an electromagnetic beam which is directed outwardly of the target. During those times that the target is producing the beam, a visible light signal is produced to alert the player that the target is "active". When the designator is accurately aimed at the target and operated to detect an electromagnetic beam, a visual and/or audible signal is produced by the designator to indicate that a "hit" has occurred. The designator also includes circuitry for developing an electromagnetic beam for transmission in the direction aimed to simulate shooting at targets worn by other players, at beam detectors corresponding to gambling choices which a player may wish to make, or at beam detectors associated with different products which a player may wish to purchase.

72 Claims, 4 Drawing Sheets

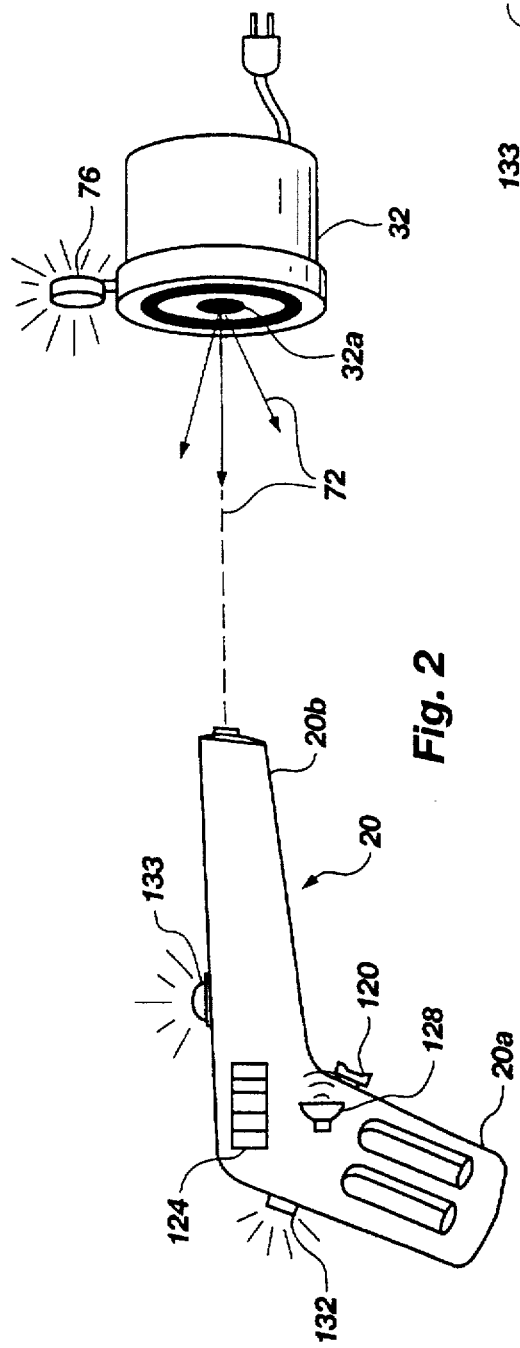
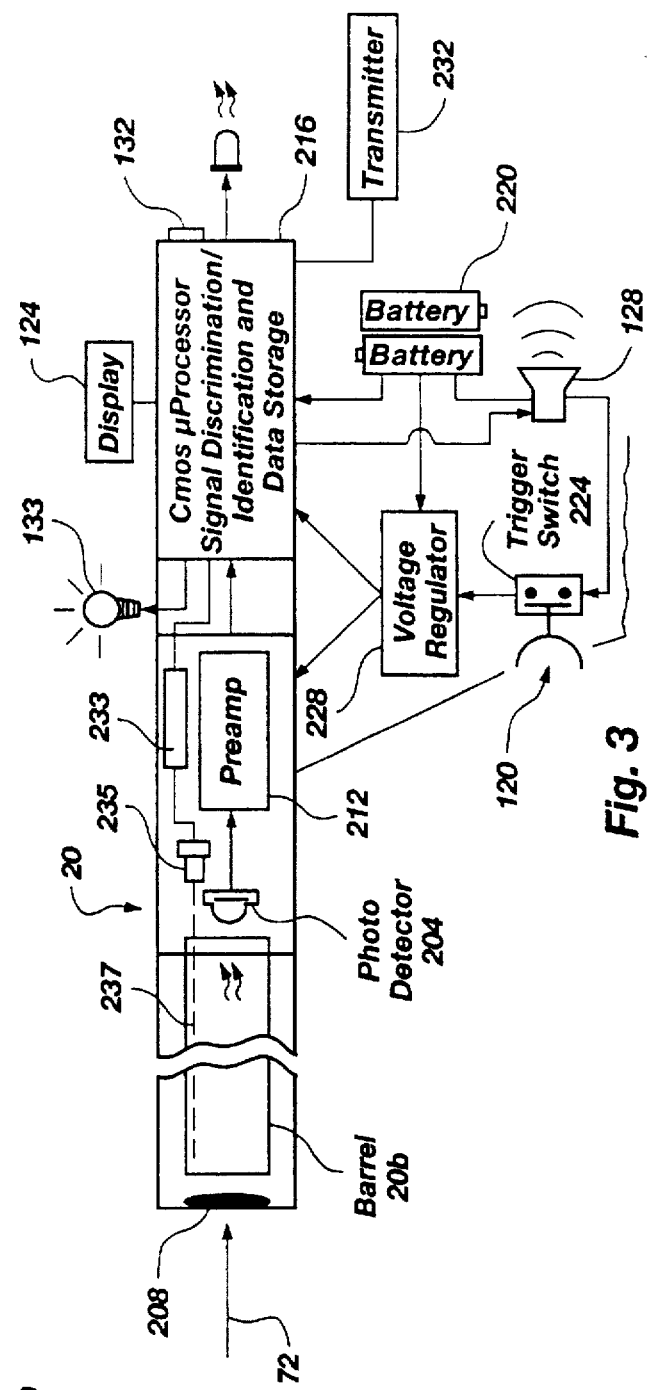
Fig. 2
Fig. 3

INTERACTIVE TARGET GAME SYSTEM

BACKGROUND OF THE INVENTION

This invention relates to a game and entertainment system in which players may walk or be moved by a vehicle which travels over a designated pathway, and during which the players may use hand-held designators to aim and shoot at targets along the pathway to gain points, may shoot at each other to similarly gain points, or may place bets or order products by aiming the designator at displayed bet alternatives or displayed products. Additionally, the designators may be adapted to allow for voice communication among the players.

Demand for entertainment and for activities in which both youth and adults may participate has increased in recent years, perhaps because of more leisure time available to families and more disposable income. As a result, entertainment complexes have sprung up in cities throughout the country, with the objective in many instances being to provide activities of interest to all ages. Even in traditional gambling centers, where gambling for money is limited to adults, there is an interest in providing entertainment for the entire family and activities which the entire family can enjoy together.

SUMMARY OF THE INVENTION

It is an object of the invention to provide a game which can be enjoyed by both adults and youth.

It is also an object of the invention to provide such a game which requires active participation and some skill.

It is a further object of the invention to provide such a game which combines the enjoyment of a ride with the challenge of target shooting.

It is still another object of the invention to provide such a game which may be organized and presented to require either individual or team participation or even simply spectating.

It is also an object of the invention to provide game apparatus which may be used for target shooting, making gambling choices, or ordering products for purchase.

It is a further object of the invention to provide game apparatus usable for a variety of functions including target shooting and voice communication.

The above and other objects of the invention are realized in a specific illustrative embodiment of an interactive target game system for one or more players which may include a vehicle on which a player may ride over a predetermined pathway in a defined area (or the player may walk), at least one designator, holdable by a player for aiming at a target and operating to simulate shooting at the target, and at least one target disposed in proximity to the pathway. An indicator device responds to the designator being accurately aimed at the target and operated, for producing an indication of a "hit" or score.

In accordance with one aspect of the invention, the indication may be either a visual signal, an audible signal, or both and may be produced by the designator or by the target.

In accordance with another aspect of the invention, the target includes apparatus for producing an electromagnetic beam which is directed outwardly of the target, and the designator includes a receiver for producing an indication of receipt of the beam when the designator is accurately aimed at the target and operated, indicating a hit.

In accordance with still another aspect of the invention, the designator includes apparatus for producing an electromagnetic beam which is directed toward the target when the designator is aimed thereat. In this aspect of the invention, the target includes a receiver which, when active and when the beam strikes the target, receives the electromagnetic beam and produces an indication of a hit.

Either the designator or the target may include a storage device for registering information that a hit has occurred so that the total number of hits may be tallied to develop a score for the user of the designator.

In accordance with a further aspect of the invention, targets may be attached to the players or worn by players so that players then become moving targets themselves for the other players. Similarly, the designators may be targets as well as "shooting" devices.

The targets may be initially hidden and then selectively moved into a viewable position for shooting. Also, the targets may be disposed at all times in viewable locations but only "active" for shooting and registering a hit at specific times. Video displays could also be provided for displaying images serving as targets at which a player could aim and operate the designator. Such video displays may be adapted to react to being "hit" by changing the image displayed.

An additional aspect of the invention involves provision for squirting a liquid at players either from squirt guns held by the players or from fixed locations when certain targets were hit.

BRIEF DESCRIPTION OF THE DRAWINGS

The above and other objects, features and advantages of the invention will become apparent from a consideration of the following detailed description presented in connection with the accompanying drawings in which:

FIG. 2 shows a side view of a designator aimed at a target, in accordance with the present invention;

FIG. 3 shows a diagrammatic view of the circuitry and optics of a designator, made in accordance with the present invention;

DETAILED DESCRIPTION

Figure 1:
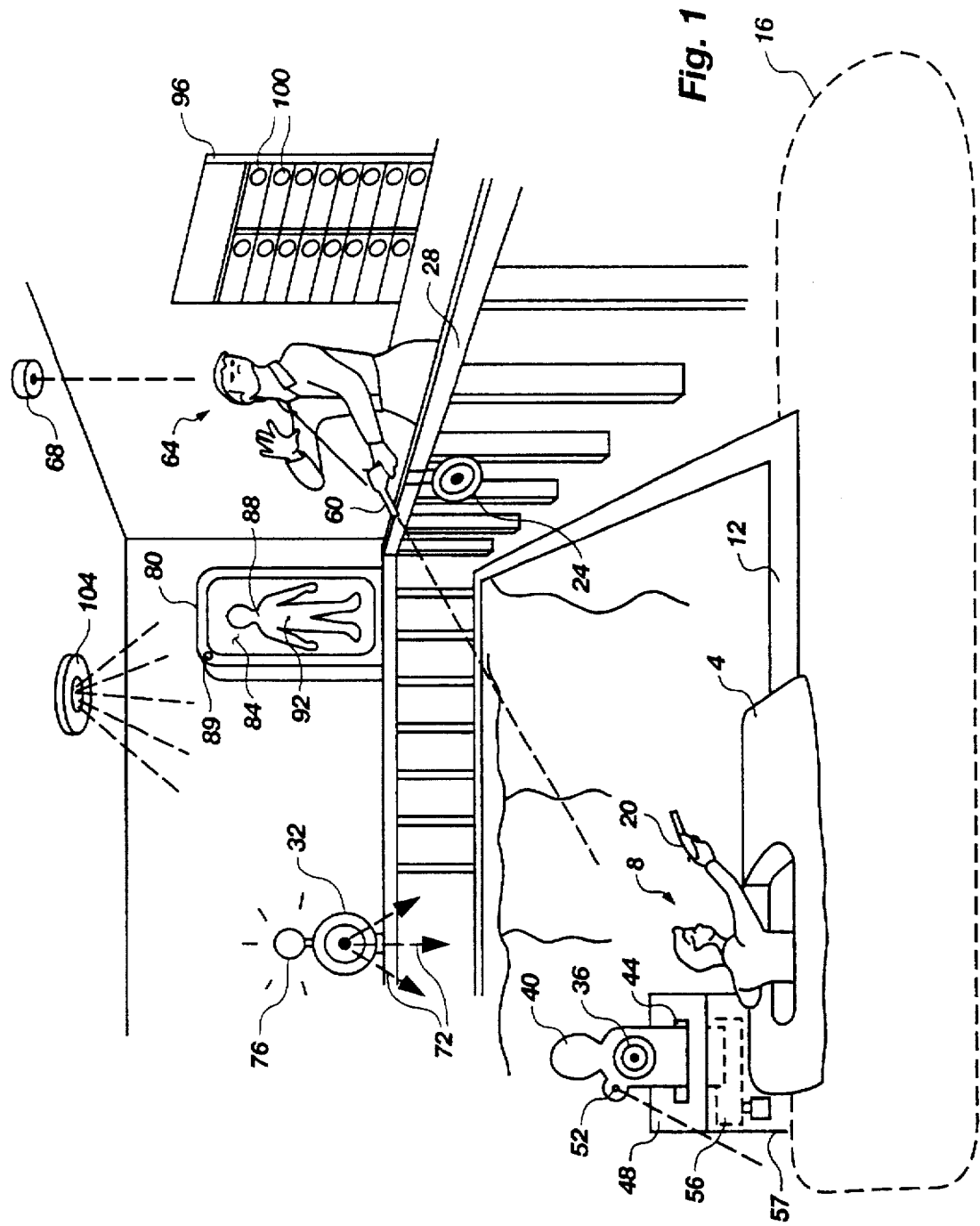
FIG. 1 depicts an interactive target game system made in accordance with the principles of the present invention.

Referring to FIG. 1, there is shown an interactive target game system made in accordance with the present invention to include a vehicle transport in the form of a simulated log 4 in which a player 8 may ride as the log 4 moves in a waterway 12 along a closed pathway represented by dotted line 16, all in a confined area, either inside or outside a structure. Such log rides are well-known and could simply be constructed in the form of a canal with jets on the sides and/or bottom dispensing water into the canal to force it to move in one direction or the other and thereby create water flow in the canal to move the logs. Some log rides include moving ramps to take the logs to a high elevation for sliding down a flume to give them momentum for movement in the canal. Any of these arrangements could be employed in the game system of FIG. 1 or alternatively wheeled vehicles could be employed for movement along tracks or other designated pathways to carry the players. Of course, the players could also simply walk.

The player 8 carries and is aiming what is termed a designator 20, in the form of a pistol, which may be used for a variety of things including aiming and shooting at targets or other players, placing gambling bets, ordering and charging for the purchase of products or services, and voice transmission and reception. In FIG. 1, the player 8 is aiming the designator 20 at a target 24 attached to a rail 28. Other targets are located along the pathway 16 to provide a challenge to the players to aim and "hit" targets in the manner to be discussed momentarily. For example, fixed target 32 is also mounted on the railing 28 and target 36 is mounted on a pop-up FIG. 40 which is normally out of view, recessed in a receptacle 44 of a base 48. The FIG. 40 is in the form of a person (but without arms) and in addition to including the target 36, also includes a water or liquid squirter 52 which squirts liquid in the direction of the pathway 16 at various times after the FIG. 40 has popped up or been moved to the exposed position shown in FIG. 1. The FIG. 40 is simply mounted on a platform shown by dotted lines 56 which, in turn, is mounted on a jack 57 which is automatically controlled to raise or lower the platform and thus raise or lower the FIG. 40. When raised, the squirter 52 automatically squirts a liquid, in this case, toward the waterway.

Also mounted near the target 24 is a squirt gun 60 being operated by another player 64. The player 64 would be considered an adversary of player 8 and would attempt, using squirt gun 60 and other squirt guns positioned in the confined area, to squirt player 8 and other players. A squirting mechanism for squirting in the reverse direction toward player 64 from the gun 60 is provided to operate in response to the target 24 being "hit", as that term will be defined momentarily. Also, a squirting mechanism 68 is shown positioned on the ceiling of the structure in which the game is played for also squirting the player 64 (or whatever player is using the squirt gun 60), when the target 24 is "hit". Thus, player 64 can attempt to squirt player 8 directly with the squirt gun 60 but player 8 can only cause the squirting of player 64 indirectly by hitting the target 24.

The squirting mechanisms described above may each include a conduit for carrying liquid under pressure, a nozzle through which the liquid is squirted, and a valve for selectively opening to allow liquid to flow from the conduit through the nozzle, and closing.

Target 32 is shown emitting beams of electromagnetic radiation such as light 72 as a lamp 76 on top of the target is illuminated. Illumination of the lamp 76 indicates to player 8 that the target 32 is enabled for shooting, i.e., that if the target 32 is "hit" by the player 8, points or a score can be obtained. When the target 32 is not enabled, indicated by the lamp 76 not being illuminated, then aiming and shooting at the target using the designator 20 will not result in points or a score being obtained even if the designator 20 is otherwise accurately aimed and fired at the target.

In the manner described, various type targets are disposed along the pathway of movement of the log 4 and player 8, some of which are not generally in view but are automatically moved into a position where they can be viewed and shot at, such as target 36, others of which are fixed in position but only enabled as targets at intermittent times, such as target 32, and still others of which are also in fixed position such as target 24, but may be shot at any time to both score points and enable squirting mechanisms to operate. Control of movement of the moveable targets, squirting of the squirting mechanisms, and causing targets to emit electromagnetic beams may be controlled by any of a variety of available programmable microprocessors, disposed with each target, etc. or centrally.

Another type of target also disposed in a fixed position near the pathway 16 is a computer controlled video display 80 having a larger than normal screen 84 for displaying various figures or objects which may serve as targets, such as animal figures, automobiles, trains, airplanes, etc. For example, a fanciful monster 88 is shown on the screen 84 and in the center of the monster is a bright spot 92 at which the designator 20 would be aimed for purposes of shooting. If the designator 20 were properly aimed at the spot 92 and fired, the resulting "hit" would be detected and the computer-formed image displayed on the screen 84 could be changed such as by diminishing in size, enlarging in size, or "morphing" into another figure or object. Of course a variety of responses could be programmed into the video display 80 to serve as a response to a "hit" occurring. The video display 80 could be any conventional large screen video display or television unit, controlled by a microprocessor.

As earlier indicated, the designator 20 can be used for a multiplicity of functions, one of which has been described as aiming and shooting at targets. Another function of the designator 20 is to enable the player 8 to place bets by simply aiming the designator at the desired bet displayed on a display board 96. The display board 96 shows two columns of possible gambling choices or bets, with detection elements 100 positioned adjacent each betting choice. The designator 20 may be aimed at the appropriate detection element 100, identifying the bet which the player 8 wishes to make, and then operated to send information to the selected detection element that placement of a bet is desired and giving the identity of the player 8 (or at least of the designator 20). The display board 96 includes microprocessor controlled circuitry for receiving information transmitted by various designators, recording which designators have placed which bets, and then either charging or crediting an account associated with the respective designators.

The designator 20 also includes a radio transmitter to enable voice communication between player 8 and other players on the premises. Transmissions from the designator 20 are made first to a receiver and transmitter 104 located on the ceiling and from there the transmission is sent to other designators. This allows players who may form one team to communicate with one another to plan strategy, indicate current status of points scored, etc.

FIG. 2 shows a side, elevational view of one embodiment of a designator 20 and a target 32. The designator 20 is formed in the shape of a gun with a handle 20a and a barrel portion 20b. A trigger 120 is disposed in the usual position at the joint between the handle 20a and the barrel portion 20b, as shown. A display such as an LED display 124 is located on the side of the designator, for displaying scores, the occurrence of a "hit", the occurrence of a "miss", the number of shots remaining, or other information desired by the user. A small speaker 128 is also located on the side of the designator for audibly alerting the user of the designator that the designator has been fired, that a hit has occurred, that a miss has occurred, that the designator is out of shots, and so on.

In one embodiment of the invention, the target 32, under control of a computer, periodically transmits electromagnetic beams 72, which could be visible light, infrared light, radio signals, etc. The target alerts the players that it is "active" as a target by lighting the lamp 76 which can be seen by the players. When so alerted, players may aim their designators at the target 32 and in particular at the bull's eye 32a from which the electromagnetic beams 72 are being emitted. If a designator is accurately aimed at the bull's eye 32a and the trigger 120 is depressed, then the electromagnetic beam 72 emanating from the target will enter the barrel portion 20b of the designator and activate circuitry in the designator indicating that a "hit" has occurred.

Upon the occurrence of a "hit", the designator 20 could emit an audible sound indicating that a hit had occurred, could develop a visual signal such as a light from lamp 132 situated on the back of the designators 20, or both. The fact that a hit had occurred could also be displayed on the display panel 124. In addition, the occurrence of a "hit" is also registered in the designator 20 for either subsequent transmission to a central scoring center or for downloading at a central place at the conclusion of the game. Also, audible/visual indications are produced to indicate the occurrence of a miss and that the designator is out of shots.

An alternative arrangement to that shown in FIG. 2 in which the target 32 periodically produces electromagnetic beams 72 for receipt by the designator 20, is to equip the designator 20 with circuitry for producing electromagnetic beam, upon depression of the trigger 120, for transmission in the direction in which the designator is aimed. In this configuration, the target 32 would be equipped with receiving circuitry for detecting an electromagnetic beam striking the bull's eye 32a. In this instance, the bull's eye 32a would include a lens for focusing electromagnetic beams on a photodetector in the target 32, regardless of the direction from which the electromagnetic beams were coming, as long as they struck the bull's eye. The target 32 would still only intermittently be activated to receive electromagnetic beams from designators and these active times would be signaled by illuminating the lamp 76. Thus, when the lamp 76 were illuminated, players would know that the target 32 was in condition for shooting. Upon the occurrence of a "hit", the target 32 could then cause the lamp 76 to flash, for example, indicating a hit or it could cause an audible alarm to sound, or both.

Whether the target 32 were sending out electromagnetic beams 72 or receiving them, the target would include control circuitry, such as a programmed microprocessor, for periodically turning on the lamp 76 and producing electromagnetic beams 72 (when sending out beams) or turn on the lamp 76 and activate the receiving circuitry (when receiving beams).

A variation of the two configurations described above would involve the target 72 producing encoded electromagnetic beams representing different values or points that a "hit" of that target would be worth. Thus, some targets would be worth one value, other targets another value, etc. with the value of each target being indicated in the encoded electromagnetic beam transmitted by that target. Then, when a designator received an electromagnetic beam from a particular target upon the occurrence of a "hit", the beam would be decoded and the value of the "hit" stored in the data storage unit in the designator. At the end of the game, or even before, data representing the total values garnered by a player could be transmitted to a central location or downloaded as earlier described. An alternative to encoding the electromagnetic beams to represent different values would be to provide different frequencies for the different beams, with the different frequencies representing different values.

A further variation on the last-mentioned embodiment would be to include electromagnetic beam producing circuitry in the designator 20, along with the electromagnetic beam receiving circuitry, so that upon receipt of an electromagnetic beam 72 from the target 32, the designator would respond by directing an electromagnetic beam (wide angle) back toward the target which would detect this beam and then produce a visual indication of a "hit" such as by lighting the lamp 76, or produce an audible signal, or both. This "confirmation" beam from the designator could also be used to confirm to the video display 80 (FIG. 1) the occurrence of a hit, e.g., accurately aiming at light spot 92, by transmitting the confirmation beam for detection by wide-angle beam sensor 89 on the video display (or by raster scan detection on the display screen). The video display 80 could then respond by changing the shape, size, etc. of the displayed image, storing data representing the occurrence of a "hit", etc.

It is obvious that there are a variety of ways of implementing the shooting and scoring by the designator 20 and target 32 whether the detection of a "hit" occurs in the designator 20, in the target 32, or both.

FIG. 3 shows a schematic of exemplary circuitry for use in a designator in accordance with the present invention. (This circuitry is also useable in targets, gambling panels, or other equipment in which detection of an electromagnetic beam is desired.) Parts of the designator already described in connection with FIG. 2 are given like numerals in FIG. 3. FIG. 3 shows an outline of the designator 20 to include the barrel portion 20b through which a light beam 72 would pass, if correctly aimed, to a photodetector 204 which could be a lateral-effect photosensor, an infrared photosensor, a CCD sensor, or the like, depending on the beam being detected. To ensure that the only electromagnetic beams detected are those which are traveling directly towards the photodetector 204, the inside surface of the barrel 206 is coated with a flat black non-reflective coating so that no "reflection" of the beam back to the photodetector can take place. A lens 208 may be included in the tip of the barrel 20b to gather and focus the beams on the photodetector 204 to thereby improve the range at which beams may be detected.

The photodetector 204, upon detection of a beam, signals a preamplifier 212 which, in turn, signals a circuit 216 which includes a microprocessor, signal discriminator, and data storage unit. The microprocessor of the circuit 216, in turn, either causes the lamp 132 to light, causes a speaker 128 to emit an audible signal, or both, indicating that a "hit" has occurred. The occurrence of the "hit" would also be stored by the microprocessor in the data storage unit of the circuit 216. Similarly, the occurrence of a "miss" or that no more "shots" were available could also be audible and/or visually indicated.

Coding of a beam, for example to indicate value of a certain target, is carried out simply by rapidly turning the beam on and off, representing "one's" and "zeroes" respectively to form a digital code. The codes may be decoded to ascertain the value of a "hit" of a particular target, by the microprocessor of circuit 216, and stored. Alternatively, different value targets could be indicated by different frequency beams which would be detected by the circuit 216 and the occurrence of a "hit" stored.

The reception of electromagnetic beam 72 and recordation of "hits" is allowed only when the trigger 120 is operated to supply power from a battery 220 via the speaker 128, a trigger switch 224 (closed when the trigger 120 is squeezed) and voltage regulator 228 to the preamplifier 212 and circuit 216. The supply of power to the speaker 128 causes the speaker to initially emit an audible sound to indicate that the trigger 120 has been operated. Later, if a "hit" (or a "miss") occurs, then the circuit 216 will cause the speaker 128 to again emit an audible sound to indicate that a hit (or different sound for a miss) has occurred. The occurrence of a hit could also be indicated by the microprocessor of circuit 216 supplying information to the display 124. Finally, if the microprocessor of the circuitry 216 were programmed to allow only a certain number of "shots", then when all the shots had been fired, the microprocessor would cause still a different audible sound and/or visual indication to be produced.

A transmitter 232 is provided to enable transmission to a central location of stored data as to the number of "hits" or total value of the "hits" as stored in the data storage unit of the circuit 216.

If confirmation of a "hit" is desired—by the designator 20 to the target (or the video display 80 of FIG. 1)—then the microprocessor of circuit 216 signals an LED driver 233 to activate an LED 235, to produce a beam 237 for transmission to a wide-angle lens 208 and back to the target. Similarly, the designator 20 may emit a coded beam (or different frequency beam) for aiming at a target, as the mode of scoring a "hit" (as opposed to the targets emitting beams for receipt by the designators). Then, the targets would record "hits" and the identity of designators used in scoring the "hits". The coded beam of a designator would also identify the player placing a bet on the display panel 96 of FIG. 1.

In addition to targets being the object of "shots" and "hits", the designators themselves may also be the objects. Then, two players could attempt to "shoot" each other by aiming at the opposing players designator. In particular, a wide-angled light emitter 133 is positioned on the top of the designator 20 and powered to continually emit light. Then, when another designator is accurately aimed at the light emitter 133 and operated or trigger depressed, light from the emitter 133 is received in the shooting designator to register a "hit". The shooting designator would likewise be equipped with a light emitter similar to emitter 133 and in this manner two players each with a designator could target each other.

Figure 4:
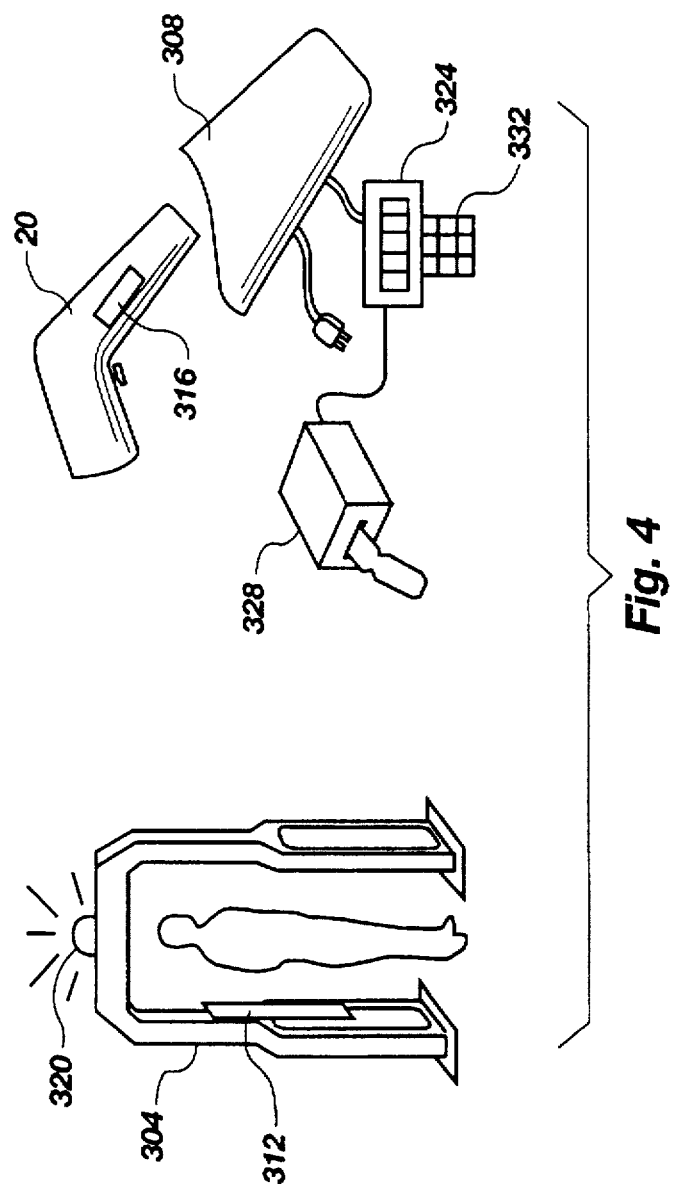
FIG. 4 schematically illustrates a designator, designator receptacle, and slip dispensing machine on which the number of hits made by a specific designator may be printed.

FIG. 4 shows a portal 304 through which players would pass to pick up designators 20 which would be held in receptacles 308 at the entrance of the game area. The portal includes a magnetic field detector 312 for detecting designators, which would carry small magnets 316, so that if a player left the game area through the portal 304, the portal would either sound an audible alarm or light a lamp 320 to alert the game supervisors that a player had not returned the designator. Of course, other forms of marking of the designators could be used so that when the designator passed through the portal 304, visual or audible alarms would sound.

In addition to simply holding the designators 20, the receptacle 308 includes conventional circuitry for charging the battery packs 220 (FIG. 3) of the designators and, upon return of designators following a game, for downloading data from the data storage units of the circuit 216 of the designators, to data storage units of a microprocessor controlled display unit 324. The display unit 324 displays the score obtained by the player for the game just completed. Also, a hard copy ticket is printed by a ticket printer 328, under control of the display unit 324, so that the player can take the ticket and have a printout of his or her score. Depending upon the score, the player may be entitled to prizes, having his/her picture taken, or other rewards.

A keyboard 332 of the display unit 324 is provided to allow programming the microprocessor of the circuit 216 (FIG. 3) to allow only a certain number of "shots" for the next game, i.e., to predetermine the number of times the designator 20 may be operated for the next game. After a player operates a designator the programmed number of shots, the microprocessor 216 will disable the designator circuitry so that it cannot be operated further, until reprogrammed, and also produce an audible and/or visual indication that no more shots are available.

Figure 5:
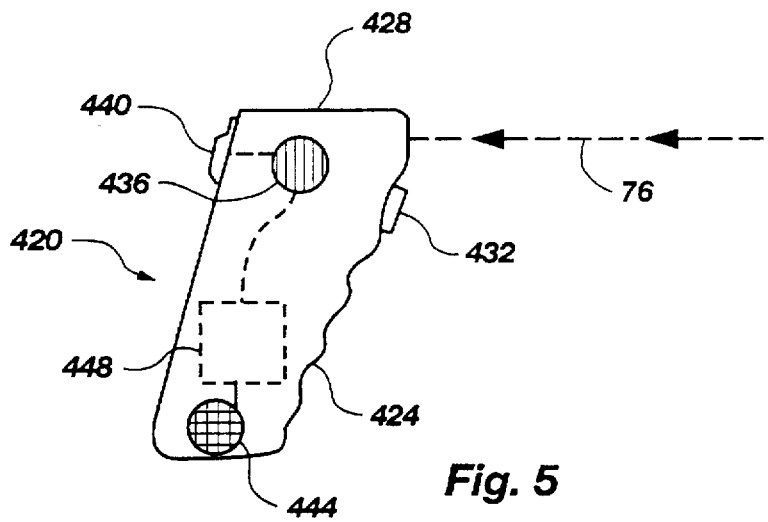
FIG. 5 is a side, elevational view of an alternative embodiment of a designator.

FIG. 5 shows an alternative style designator 420 to include a handle portion 424 for gripping by a player and an upper portion 428 for receiving an electromagnetic beam 76 as previously described. The trigger 432 is positioned for ease of operation by a person holding the designator 420 by the handle portion 424.

In addition to the circuitry described in connection with FIG. 3, the designator 420 of FIG. 5 includes sound transmission circuitry including a microphone 436 which may be activated by pushing an activate button 440 to enable the player to speak into the microphone for communicating with other players. A speaker 444 is disposed at the bottom of the handle portion 424 for broadcasting to the player holding the designator radio signals received from other players. Conventional two-way radio circuitry 448 is disposed in the handle portion 424 to enable two-way conversations between a player using designator 420 and other players having similar designators. The radio signals may be transmitted directly between designators via the receiver and transmitter 104 of FIG. 1.

Figure 6:
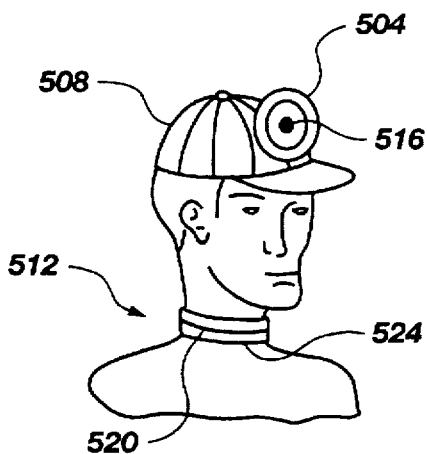
FIG. 6 shows a conventional cap with target mounted thereon.

FIG. 6 shows two embodiments of wearable targets, one of which, identified by numeral 504, is disposed on a cap 508 worn by a player, and the other of which, indicated by numeral 512, is worn around the neck of the player. Both of the targets 504 and 512 simply detect electromagnetic beams directed from a designator with target 504 detecting a beam only when it impinges upon the bull's eye 516 and the target 512 detecting beams which impinge upon a center strip 520 formed on a collar 524 worn about the neck of the player. The bull's eye 516 and central strip 520 comprise photodetectors which, when an electromagnetic beam is received, cause the lighting of lamps or sounding of audible alarms to indicate that a "hit" has occurred, as previously described.

Figure 7:
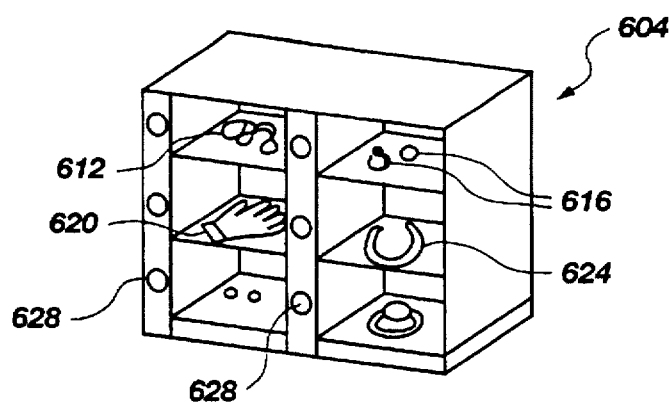
FIG. 7 is a perspective view of a product dispensing and ordering console made in accordance with the present invention.

FIG. 7 shows a display case 604 in which are displayed various goods such as a necklace 612, rings 616, gloves 620, a choker 624, etc. which may be ordered using the designators of the present invention. The items are shown displayed on shelves and adjacent each item is a photoreceptor 628 for receiving a coded electromagnetic beam from the designators, when the designators are appropriately aimed at the photoreceptors, indicating that a player desires to purchase the product whose respective photoreceptor is "hit". The photoreceptors 628 receive the coded beams, decode the beams to identify the designator being used and then debit the account preprogrammed into a microprocessor associated with the display case. The account debited, of course, would be of the player using the designator to order the goods. The player could then simply pick up the goods at that time or they could be delivered to the player at a later time. Alternatively, the display case 604 could be constructed as a product dispenser, similar to coin-operated dispensers, except that the dispenser would dispense the product when corresponding photoreceptors 628 were hit. The operation and use of a designator for such ordering is similar to use of the designator for making a gambling choice, as described in connection with the display board 96 of FIG. 1.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An interactive target game system for one or more players comprising at least one target means for viewing by a player;

at least one designator means for holding by the player, for aiming at the at least one target means, and for operating to simulate shooting at the at least one target means;

electromagnetic beam producing means for producing an electromagnetic beam for exchange between the designator means and the at least one target means when the at least one designator means is accurately aimed at the at least one target means and operated;

indicator means for producing an indication of a hit when the electromagnetic beam is exchanged between the at least one designator means and at least one target means; and receptacle means for receiving and holding said at least one designator means, and for receiving and storing information transmitted by said at least one designator means.

2. A system as in claim 1 wherein said indicator means includes means for producing a visual indication of a hit.

3. A system as in claim 1 wherein said indicator means includes means for producing an audible indication of a hit.

4. A system as in claim 1 wherein said indicator means is disposed in the designator means for perceiving by a player holding the indicator means.

5. A system as in claim 1 wherein said indicator means is disposed on the target means.

6. A system as in claim 1 wherein said electromagnetic beam producing means is disposed in the target means for directing the beam outwardly of the target means, and wherein said designator means includes means for receiving and producing an indication of receipt of the beam when the designator means is accurately aimed at the target means and operated, indicating a hit.

7. A system as in claim 6 wherein said receiving and producing means comprises second means for producing an electromagnetic beam which is directed toward the target means when the designator means is aimed thereat, and wherein said target means includes means for producing a visual/audible indication when the beam from the designator means strikes the target means.

8. A system as in claim 6 wherein said receiving and producing means comprises means for registering information that a hit has occurred.

9. A system as in claim 6 wherein said electromagnetic beam producing means includes means for producing an encoded electromagnetic beam representing a predetermined value, and wherein said receiving and producing means includes means for registering the values represented by encoded electromagnetic beams received by the receiving and producing means.

10. A system as in claim 6 wherein said electromagnetic beam producing means includes means for producing a beam having a selected frequency representing a predetermined value, and wherein said receiving and producing means include means for registering the values represented by the frequencies of electromagnetic beams received by the receiving and producing means.

11. A system as in claims 9 or 10 wherein said receiving and producing means further comprises means for transmitting information representing the registered values.

12. A system as in claim 11 further including central means for receiving and storing transmitted information.

13. A system as in claim 6 wherein said designator means further includes a barrel means having a terminal end and a proximal end, and detector means disposed in the barrel means near the proximal end for detecting the beam from the target means entering the barrel means through the terminal end, when the designator means is accurately aimed at the target means and operated.

14. A system as in claim 13 wherein said detector means comprises beam detecting means for detecting the beam from the target means when activated, and trigger means accessibly disposed on the designator means for manual operation to activate the beam detecting means.

15. A system as in claim 14 wherein said central bore includes a blackened interior surface.

16. A system as in claim 14 wherein said beam detecting means includes a photodetector means.

17. A system as in claim 14 wherein said designator means further includes handle means for gripping by a player, said barrel means being disposed on an upper end of the handle means for aiming by a player gripping the handle means, and wherein said trigger means is disposed near the joint of the handle means and barrel means for manual operation by a player gripping the handle means.

18. A system as in claim 6 wherein said designator means further includes handle means for gripping by a player, said handle means having an upper end which extends above the hand of a player when gripped, and a front edge, said receiving and producing means being disposed in the front edge at the upper end of the handle means.

19. A system as in claim 1 wherein said receptacle means includes means for transmitting data representing the information received and stored by the receptacle means, said system further including display means for receiving and displaying data transmitted by the receptacle means.

20. A system as in claim 1 wherein said receptacle means includes means for transmitting data representing the information received and stored by the receptacle means, said system further including slip dispensing means for receiving data transmitted by the receptacle means and dispensing slips showing the values represented by the transmitted information and data.

21. A system as in claim 1 wherein said electromagnetic beam producing means is disposed in the designator means for directing an electromagnetic beam toward the target means when the designator means is aimed thereat, and wherein said target means includes means, when active, for receiving and producing an indication of receipt of the beam when the beam strikes the target means.

22. A system as in claim 21 wherein said target means further includes means for registering information that a hit has occurred.

23. A system as in claim 21 wherein said electromagnetic beam producing means includes means for producing a beam which identifies the designator means from which the beam is emitted.

24. A system as in claim 23 wherein said target means includes means for detecting beams received thereby and for registering the identities of the designator means from which the beams were emitted.

25. A system as in claim 24 wherein said target means further includes means for transmitting information representing said identities, and wherein said system further includes central means for receiving and storing information transmitted by the target means.

26. A system as in claim 21 wherein said designator means further includes means for emitting a sound simulating a gunshot, when operated.

27. A system as in claim 21 wherein said target means further includes means for randomly activating the receiving and producing means.

28. A system as in claim 21 wherein said target means further includes means for steadily activating the receiving and producing means.

29. A system as in claim 21 wherein said target means further includes means for emitting visible light for viewing by a player, when the receiving and producing means is active.

30. A system as in claim 21 wherein said receiving and producing means includes means for emitting visible light when the beam strikes the target means.

31. A system as in claim 21 wherein said receiving and producing means includes means for emitting audible sound when the beam strikes the target means.

32. A system as in claim 1 further including means for attaching the target means to the neck of a player.

33. A system as in claim 32 wherein said target means is adapted to wrap about the neck of a player.

34. A system as in claim 1 further including means for attaching the target means to the head or body of a player.

35. A system as in claim 34 wherein said target means is formed into a cap for wearing by a player.

36. A system as in claim 1 wherein said target means includes
   a target element for aiming at by a player with a designator means, and
   base means for holding the target element in a non-viewable position where the target element cannot be seen by a player, and for selectively moving the target element from the non-viewable position to a viewable position where the target element can be seen by a player.

37. A system as in claim 1 wherein said target means includes
   video display means for displaying images serving as targets and for aiming at by a player with the designator means.

38. A system as in claim 37 wherein said video display means includes means for producing one or more areas in the images which are brighter than the rest of the display.

39. A system as in claim 38 wherein said designator means includes means for detecting said one or more areas when the designator means is accurately aimed at the one or more areas and operated, to thereby indicate a hit.

40. A system as in claim 39 wherein said designator means further includes means for signalling the video display means when a hit is detected.

41. A system as in claim 40 wherein said video display means includes means for detecting the signal from the designator means indicating that a hit has occurred, and means for modifying the displayed images when signaled by the designator means that a hit has occurred.

42. A system as in claim 1 wherein said indicator means further includes means for producing an indication of a miss, when the designator means is inaccurately aimed at the target means and operated.

43. A system as in claim 1 wherein said designator means further includes means for controlling the designator means for limiting the number of times of operation of the designator means.

44. A system as in claim 43 wherein said controlling means includes means for producing an indication when the designator means has been operated said certain number of times.

45. A system as in claim 43 wherein said controlling means includes programming means for limiting operation of the designator means to no more than a preselected number of times.

46. An interactive target game system for one or more players comprising:
   at least one target means for viewing by a player;
   at least one designator means for holding by the player, for aiming at the at least one target means, and for operating to simulate shooting at the at least one target means;
   electromagnetic beam producing means for producing an electromagnetic beam for exchange between the designator means and the at least one target means when the at least one designator means is accurately aimed at the at least one target means and operated;
   indicator means for producing an indication of a hit when the electromagnetic beam is exchanged between the at least one designator means and at least one target means;
   display means for at least periodically displaying indicia showing a plurality of gambling choices;
   a plurality of beam detecting means, each associated with a respective gambling choice for receiving and detecting beams directed thereat from designator means, indicating selection of the respective choice; and
   means for registering choices made and the identity of the designator means used to make the respective choices.

47. An interactive target game system for one or more players comprising
   at least one target means for viewing by a player:
   at least one designator means for holding by the player, for aiming at the at least one target means, and for operating to simulate shooting at the at least one target means;
   electromagnetic beam producing means for producing an electromagnetic beam for exchange between the designator means and the at least one target means when the at least one designator means is accurately aimed at the at least one target means and operated;
   indicator means for producing an indication of a hit when the electromagnetic beam is exchanged between the at least one designator means and at least one target means;
   display means for displaying indicia identifying a plurality of products available for purchase;
   a plurality of beam detecting means, each associated with a respective product for receiving and detecting beams directed thereat from designator means, indicating selection of the respective product; and
   means for registering selection of products and the identity of the designator means used to select the respective products.

48. An interactive target game system for one or more players comprising:
- at least one target means for viewing by a player;
- at least one designator means for holding by the player, for aiming at the at least one target means, and for operating to simulate shooting at the at least one target means;
- electromagnetic beam producing means for producing an electromagnetic beam for exchange between the designator means and the at least one target means when the at least one designator means is accurately aimed at the at least one target means and operated;
- indicator means for producing an indication of a hit when the electromagnetic beam is exchanged between the at least one designator means and the at least one target means; and
- one or more stationary stations which includes fixed gun means for squirting liquid toward an object at which the gun means is aimed when operated by a second player, second target means disposed near the gun means, and response means responsive to the designator means being accurately aimed at the second target means and operated, for signaling the second player that the second target means has been hit.

49. A system as in claim 48 wherein said response means comprises means for squirting a liquid toward the fixed gun means and second player.

50. A system as in claim 49 wherein said response means is disposed in the gun means.

51. An interactive target game system for one or more players comprising:
- at least one target means for viewing by a player;
- at least one designator means for holding by the player, for aiming at the at least one target means, and for operating to simulate shooting at the at least one target means, the at least one designator means including receiver means for receiving a radio signal carrying sound information, and speaker means for producing sound from received radio signals;
- electromagnetic beam producing means for producing an electromagnetic beam for exchange between the designator means and the at least one target means when the at least one designator means is accurately aimed at the at least one target means and operated; and
- indicator means for producing an indication of a hit when the electromagnetic beam is exchanged between the at least one designator means and the at least one target means.

52. A system as in claim 51 wherein the designator means further includes microphone means for producing electrical signals representing sound intercepted by the microphone means, and transmitter means for transmitting a radio signal carrying sound information represented by the electrical signals.

53. A system as in claim 52 further including central means for receiving radio signals from one or more designator means, and for retransmitting received radio signals.

54. An interactive target game system for one or more players comprising:
- at least one target means for viewing by a player;
- at least one designator means for holding by the player, for aiming at the at least one target means, and for operating to simulate shooting at the at least one target means;
- electromagnetic beam producing means for producing an electromagnetic beam for exchange between the designator means and the at least one target means when the at least one designator means is accurately aimed at the at least one target means and operated;
- indicator means for producing an indication of a hit when the electromagnetic beam is exchanged between the at least one designator means and the at least one target means; and
- portal means through which players must pass to enter and exit the area where the game system is located, said portal means including means for detecting a designator means on a player as the player passes through the portal means.

55. An interactive target game system for one or more players comprising:
- at least one target means for viewing by a player;
- at least one designator means for holding by the player, for aiming at the at least one target means, and for operating to simulate shooting at the at least one target means;
- electromagnetic beam producing means for producing an electromagnetic beam for exchange between the designator means and the at least one target means when the at least one designator means is accurately aimed at the at least one target means and operated;
- indicator means for producing an indication of a hit when the electromagnetic beam is exchanged between the at least one designator means and the at least one target means; and
- receptacle means for insertion of the designator means, said receptacle means including means for programming the controlling means for limiting operation of the designator means to no more than a preselected number times.

56. A system as in claim 55 wherein said indicator means is disposed in the designator means and includes means for registering information that a hit has occurred, and wherein said receptacle means includes means for downloading and storing information from the designator means as to a number of hits which have occurred, when the designator means is inserted in the receptacle.

57. An interactive game system for one or more players comprising
- vehicle means for riding by a player over a predetermined pathway in a defined area;
- at least one designator means for holding by a player while riding on the vehicle means, for aiming at a target, and for operating to simulate shooting at the target, said designator means being buoyant in water;
- at least one target means disposed in proximity to the pathway; and
- indicator means responsive to the designator means being accurately aimed at the target means and operated for producing an indication of a hit.

58. A system as in claim 57 wherein said indicator means is disposed in the designator means for perceiving by a player holding the indicator means.

59. A system as in claim 57 wherein said indicator means is disposed on the target means.

60. A system as in claim 57 wherein said target means includes means for producing an electromagnetic beam which is directed outwardly of the target means, and wherein said designator means includes means for receiving and producing an indication of receipt of the beam when the designator means is accurately aimed at the target means and operated, indicating a hit.

61. A system as in claim 60 wherein said receiving and producing means comprises second means for producing an electromagnetic beam which is directed toward the target means when the designator means is aimed thereat, and wherein said target means includes means for producing a visual/audible indication when the beam from the designator means strikes the target means.

62. A system as in claim 60 wherein said receiving and producing means comprises means for registering information that a hit has occurred.

63. A system as in claim 57 wherein said vehicle means comprises
    a flume formed to follow a closed, continuous pathway in which water flows, and
    at least one buoyant simulated log disposed in the flume to float along the pathway, said log being formed with one or more seats for players to sit upon and ride as the log floats along the pathway.

64. A system as in claim 57 further including portal means through which players must pass to enter and exit the vehicle means, said portal means including means for detecting the presence of a designator means on a player as the player passes through the portal means.

65. An interactive target game system for two or more players comprising
    two or more designator means, each for holding by a different player, for aiming at another designator means and operating to simulate shooting at another designator means, each designator means comprising:
    means for producing electromagnetic beams for transmission outwardly of said each designator means for viewing the electromagnetic beams, said electromagnetic beam producing means includes means for producing electromagnetic beams which are directed outwardly through a substantially 360 degree arc; and
    means for receiving and producing an indication of receipt of electromagnetic beams when said each designator means is accurately aimed at the electromagnetic beam producing means producing such beams, and operated, indicating a hit.

66. A system as in claim 65 wherein said receiving and producing means includes means for producing an audible/visual indication of a hit.

67. A system as in claim 65 wherein said receiving and producing means comprises means for registering information that a hit has occurred.

68. A system as in claim 67 wherein said receiving and producing means further comprises means for transmitting the registered information.

69. A system as in claim 68 further including central means for receiving and storing information transmitted by said each designator means.

70. A system as in claim 68 further including receptacle means for receiving and holding said each designator means, and for receiving and storing information transmitted by said each designator means.

71. A system as in claim 70 wherein said receptacle means includes means for transmitting data representing the information received and stored by the receptacle means, said system further including display means for displaying data transmitted by the receptacle means.

72. An interactive target game system for one or more players comprising:
    at least one target means for viewing by a player;
    at least one designator means for holding by the player, for aiming at the at least one target means, and for operating to simulate shooting at the at least one target means;
    electromagnetic beam producing means for producing an electromagnetic beam for exchange between the designator means and the at least one target means when the at least one designator means is accurately aimed at the at least one target means and operated, said electromagnetic beam producing means includes means for producing electromagnetic beams which are directed outwardly through a substantially 360 degree arc; and
    indicator means for producing an indication of a hit when the electromagnetic beam is exchanged between the at least one designator means and the at least one target means.

* * * * *